US011914398B2

(12) United States Patent
Ha

(10) Patent No.: US 11,914,398 B2
(45) Date of Patent: Feb. 27, 2024

(54) METHOD, SYSTEM, AND NON-TRANSITORY COMPUTER-READABLE RECORDING MEDIUM FOR CONTROLLING A ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 339 days.

(21) Appl. No.: 17/340,297

(22) Filed: Jun. 7, 2021

(65) Prior Publication Data

US 2022/0390958 A1    Dec. 8, 2022

(51) Int. Cl.
| | | |
|---|---|---|
| *G05D 1/02* | (2020.01) |
| *B25J 9/16* | (2006.01) |
| *B25J 11/00* | (2006.01) |
| *G05D 1/00* | (2006.01) |

(52) U.S. Cl.
CPC .......... *G05D 1/0291* (2013.01); *B25J 9/1689* (2013.01); *B25J 11/008* (2013.01)

(58) Field of Classification Search
CPC ...... G05D 1/0291; B25J 9/1689; B25J 11/008
USPC ..................................................... 340/425.1
See application file for complete search history.

(56) References Cited

U.S. PATENT DOCUMENTS

| | | | | |
|---|---|---|---|---|
| 10,979,956 B2* | 4/2021 | Gassend | ............... | H04W 36/14 |
| 2008/0263628 A1* | 10/2008 | Norman | ................ | G08C 17/02 |
| | | | | 726/1 |
| 2019/0084161 A1* | 3/2019 | Tokuhashi | ............. | B25J 9/0084 |
| 2019/0335341 A1* | 10/2019 | Ju | ........................ | H04W 16/26 |
| 2020/0053324 A1* | 2/2020 | Deyle | .................. | G05D 1/0088 |
| 2020/0249660 A1* | 8/2020 | Rao | ....................... | B67D 1/0888 |
| 2022/0386395 A1* | 12/2022 | Aijaz | ..................... | H04W 84/18 |

FOREIGN PATENT DOCUMENTS

| | | |
|---|---|---|
| EP | 1548530 A1 | 6/2005 |
| JP | H05-233059 A | 9/1993 |
| JP | 2003-143048 A | 5/2003 |
| KR | 1020160023065 A | 3/2016 |
| KR | 102242380 B1 | 4/2021 |
| WO | 2021-024352 A1 | 11/2021 |

\* cited by examiner

*Primary Examiner* — Kerri L McNally
(74) *Attorney, Agent, or Firm* — Dinsmore & Shohl LLP; Yongsok Choi, Esq.

(57) ABSTRACT

A method for controlling a robot is provided. The method includes the steps of: acquiring information on status of communication connections between a plurality of robots located in a serving place, wherein the status of communication connections between the plurality of robots is specified with respect to at least one relay robot among the plurality of robots; and determining a communication scheme to be used between the plurality of robots, with reference to the information on the status of communication connections between the plurality of robots.

15 Claims, 6 Drawing Sheets

300

METHOD, SYSTEM, AND NON-TRANSITORY COMPUTER-READABLE RECORDING MEDIUM FOR CONTROLLING A ROBOT

FIELD OF THE INVENTION

The present invention relates to a method, system, and non-transitory computer-readable recording medium for controlling a robot.

BACKGROUND

Robots are utilized to replace or assist people in various fields because they can automatically perform difficult tasks or repetitive operations. Recently, various researches are being conducted on techniques for smoothly controlling a plurality of robots.

As an example of related conventional techniques, Korean Registered Patent Publication No. 10-2242380 discloses a restaurant serving robot system for managing and controlling a plurality of assistance robots, such as an order robot configured to take orders for various menus at a restaurant, a side dish robot configured to transport various refill side dishes placed on a tray to a table where a beeper is activated, a drink robot configured to transport various drinks placed on a tray to a table where a beeper is activated, and a follower robot configured to follow an employee who provides services in response to requests of customers and to assist in cleaning tables or providing various items loaded on multi-tiered trays.

However, according to the techniques introduced so far as well as the above-described conventional technique, a plurality of robots are controlled or communication between the plurality of robots is carried out using a single communication scheme (e.g., Bluetooth communication or Wi-Fi communication), which causes a disadvantage that it is difficult to smoothly control the robots because communication failures (e.g., weak or lost communication connections) often occur due to spatial problems of a serving place (e.g., the presence of walls or obstacles).

In this connection, the inventor(s) present a novel and inventive technique capable of dynamically determining a communication scheme to be used between a plurality of robots located in a serving place, with reference to information on status of communication connections between the plurality of robots, which is acquired with respect to at least one relay robot among the plurality of robots.

SUMMARY OF THE INVENTION

One object of the present invention is to solve all the above-described problems in the prior art.

Another object of the invention is to smoothly maintain communication connections between a plurality of robots located in a serving place.

Yet another object of the invention is to dynamically determine or change a communication scheme to be used between a plurality of robots located in a serving place.

Still another object of the invention is to dynamically determine a robot for carrying out relaying for other robots from among a plurality of robots located in a serving place.

Still yet another object of the invention is to improve status of communication connections between a plurality of robots by causing at least one robot (e.g., a relay robot) to be moved to a predetermined location in a serving place.

The representative configurations of the invention to achieve the above objects are described below.

According to one aspect of the invention, there is provided a method for controlling a robot, the method comprising the steps of: acquiring information on status of communication connections between a plurality of robots located in a serving place, wherein the status of communication connections between the plurality of robots is specified with respect to at least one relay robot among the plurality of robots; and determining a communication scheme to be used between the plurality of robots, with reference to the information on the status of communication connections between the plurality of robots.

According to another aspect of the invention, there is provided a system for controlling a robot, the system comprising: an information acquisition unit configured to acquire information on status of communication connections between a plurality of robots located in a serving place, wherein the status of communication connections between the plurality of robots is specified with respect to at least one relay robot among the plurality of robots; and a communication scheme determination unit configured to determine a communication scheme to be used between the plurality of robots, with reference to the information on the status of communication connections between the plurality of robots.

In addition, there are further provided other methods and systems to implement the invention, as well as non-transitory computer-readable recording media having stored thereon computer programs for executing the methods.

According to the invention, it is possible to smoothly maintain communication connections between a plurality of robots located in a serving place.

According to the invention, it is possible to dynamically determine or change a communication scheme to be used between a plurality of robots located in a serving place.

According to the invention, it is possible to dynamically determine a robot for carrying out relaying for other robots from among a plurality of robots located in a serving place.

According to the invention, it is possible to improve status of communication connections between a plurality of robots by causing at least one robot (e.g., a relay robot) to be moved to a predetermined location in a serving place.

DETAILED DESCRIPTION OF THE INVENTION

Figure 1:
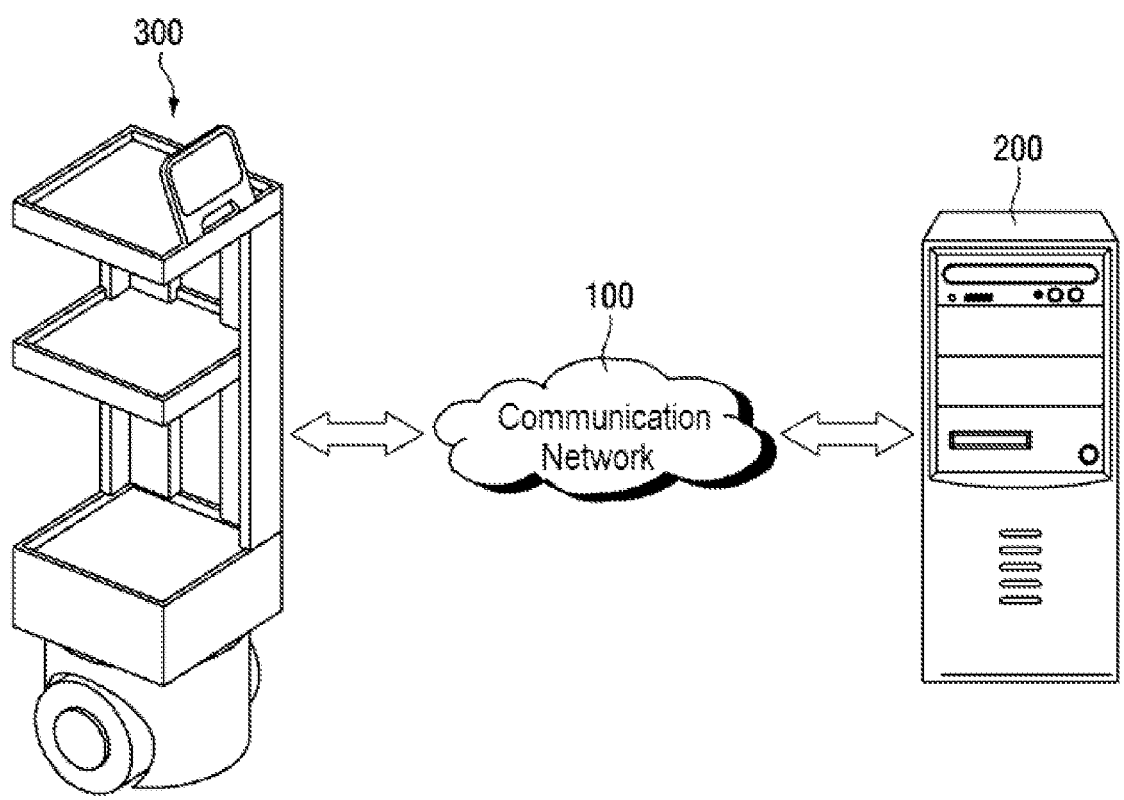
FIG. 1 schematically shows the configuration of an entire system for controlling a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a robot according to one embodiment of the invention.

As shown in FIG. 1, the entire system according to one embodiment of the invention may comprise a communication network 100, a robot control system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the robot control system 200 according to one embodiment of the invention may communicate with the robot 300 to be described below via the communication network 100, and may function to acquire information on status of communication connections between a plurality of robots 300 located in a serving place, wherein the status of communication connections between the plurality of robots 300 is specified with respect to at least one relay robot 300 among the plurality of robots 300, and to determine a communication scheme to be used between the plurality of robots 300, with reference to the information on the status of communication connections between the plurality of robots 300. Here, the serving place may include an indoor place such as a restaurant, a museum, and a shop, or an outdoor place such as a park and a zoo.

Meanwhile, the above description is illustrative although the robot control system 200 has been described as above, and it will be apparent to those skilled in the art that at least a part of the functions or components required for the robot control system 200 may be implemented or included in the robot 300 to be described below or an external system (not shown), as necessary. Further, in some cases, all of the functions and components of the robot control system 200 may be implemented or included in the robot 300.

Next, the robot 300 according to one embodiment of the invention is a device that may communicate with the robot control system 200 via the communication network 100, and may autonomously perform predetermined functions or assigned tasks (e.g., serving food, retrieving containers, etc.) without any operation of a user. The robot 300 may include at least one of a module (e.g., a grab or a robotic arm module) for loading and unloading an object (e.g., a food tray), an imaging module (e.g., a visible light camera or an infrared camera) for acquiring images of surroundings, a display and speaker module for providing various image or sound contents, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for controlling the robot 300 (e.g., acquiring information on status of communication connections between a plurality of robots or determining a communication scheme to be used between the plurality of robots) according to the invention. The application may be downloaded from the robot control system 200 or an external application distribution server (not shown).

Configuration of the Robot Control System

Hereinafter, the internal configuration of the robot control system 200 crucial for implementing the invention and the functions of the respective components thereof will be discussed.

Figure 2:
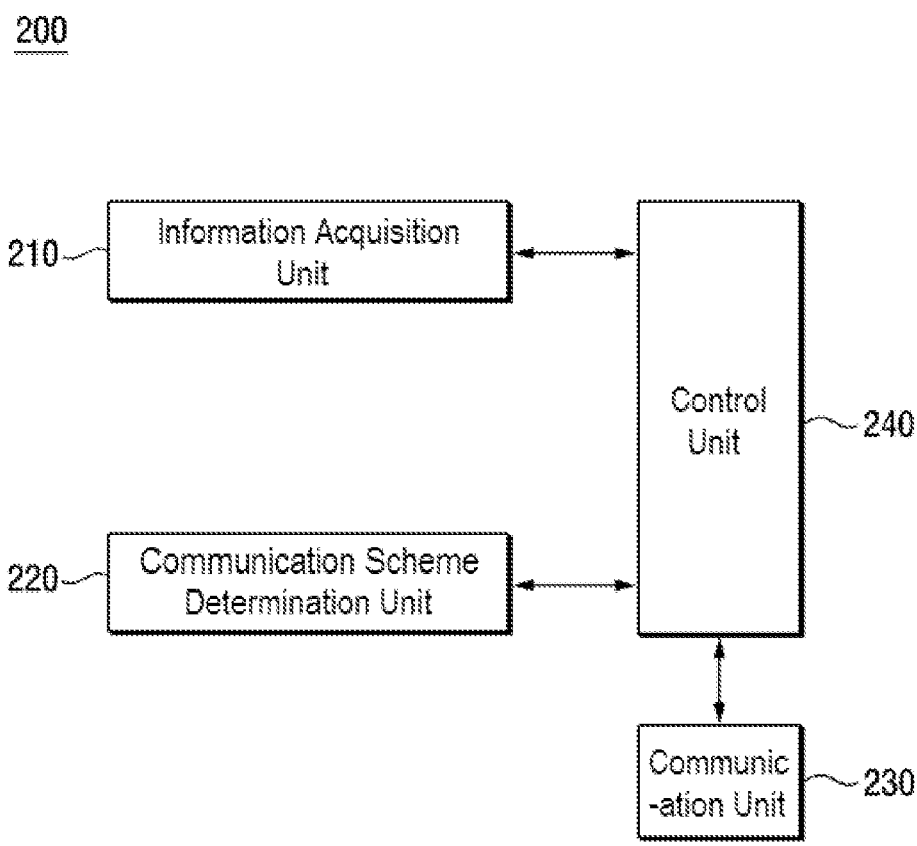
FIG. 2 illustratively shows the internal configuration of a robot control system according to one embodiment of the invention.

FIG. 2 illustratively shows the internal configuration of the robot control system 200 according to one embodiment of the invention.

As shown in FIG. 2, the robot control system 200 according to one embodiment of the invention may comprise an information acquisition unit 210, a communication scheme determination unit 220, a communication unit 230, and a control unit 240. According to one embodiment of the invention, at least some of the information acquisition unit 210, the communication scheme determination unit 220, the communication unit 230, and the control unit 240 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

First, the information acquisition unit 210 according to one embodiment of the invention may function to acquire information on status of communication connections between a plurality of robots 300 located in a serving place, wherein the status of communication connections between the plurality of robots 300 is specified with respect to at least one relay robot 300 among the plurality of robots 300. The information on the status of communication connections between the plurality of robots 300 according to one embodiment of the invention may include information on a communication scheme (e.g., Bluetooth communication or Wi-Fi communication), communication strength, communication bandwidth, communication speed, communication delay, communication quality, and the like of communication performed between the plurality of robots 300. The relay robot 300 according to one embodiment of the invention may encompass a robot that is connected to other robots 300 located in the serving place or an external system using at least one communication scheme, and configured to monitor status of at least one robot 300, send a predetermined command to at least one robot 300, or control or manage at least one robot 300.

For example, the information acquisition unit 210 may determine the relay robot 300 from among the plurality of robots 300 with reference to at least one of placement information of the plurality of robots 300 (e.g., information on locations, distribution, and the like of the plurality of robots 300 in the serving place) and spatial information (e.g., geography information, obstacle information, boundary information, and the like) of the serving place, and may acquire the information on the status of communication connections between the plurality of robots 300 with reference to information on status of a communication connection between the determined relay robot 300 and each of other robots 300 in the service place. More specifically, the information acquisition unit 210 may determine a robot satisfying the condition that the sum of distances to other robots 300 is minimized as the relay robot 300, with reference to the locations (or distribution) of the plurality of robots 300 in the serving place. Further, the information acquisition unit 210 may acquire information on status of a communication connection between the relay robot 300 and a first robot 300 in the serving place and information on status of a communication connection between the relay robot 300 and a second robot 300 in the serving place as the information on the status of communication connections between the plurality of robots 300.

As another example, the information acquisition unit 210 may determine the relay robot 300 with reference to first assessment information on status of communication connections specified with respect to a first robot 300 among the plurality of robots 300, and second assessment information on status of communication connections specified with respect to a second robot 300 among the plurality of robots 300, and may acquire the information on the status of communication connections between the plurality of robots 300 which is specified with respect to the relay robot 300. More specifically, the information acquisition unit 210 may determine the relay robot 300 by comparing a first assessment score calculated with reference to status of communication connections between the first robot 300 and the plurality of other robots 300 (i.e., first assessment information) and a second assessment score calculated with reference to status of communication connections between the second robot 300 and the plurality of other robots 300 (i.e., second assessment information) (e.g., the robot 300 having a relatively higher calculated score may be determined as the relay robot 300). Here, the scores may be calculated with reference to a communication scheme (e.g., Bluetooth communication or Wi-Fi communication), communication strength, communication bandwidth, communication speed, communication delay, communication quality, and the like of communication performed between each of the first robot 300 and the second robot 300 and other robots 300, and may also be calculated by assigning predetermined weights to the communication scheme, communication strength, communication bandwidth, communication speed, communication delay, communication quality, and the like.

As yet another example, the information acquisition unit 210 may determine a robot 300 satisfying a condition determined or specified by a manager of the serving place or a specific user among the plurality of robots 300 as the relay robot 300, and may acquire the information on the status of communication connections between the plurality of robots 300 which is specified with respect to the relay robot 300.

Meanwhile, the relay robot 300 according to the invention is not necessarily statically determined, and may be dynamically determined according to a predetermined cycle (e.g., every 5 minutes), a predetermined trigger condition (e.g., when assessment information on status of communication connections indicates that the status of communication connections is below a predetermined level, or when a request is made by the manager of the serving place), and the like.

For example, when the first robot 300 is determined as the relay robot 300 and a predetermined time (or a predetermined cycle) has elapsed, the information acquisition unit 210 may compare first assessment information on status of communication connections between the plurality of robots 300, which is specified with respect to the first robot 300 among the plurality of robots 300, and second assessment information on status of communication connections between the plurality of robots 300, which is specified with respect to the second robot 300 among the plurality of robots 300, and may determine the second robot 300 as the relay robot 300 (i.e., change the relay robot 300 from the first robot 300 to the second robot 300) when it is determined that the second assessment information indicates a higher level of status of communication connections than the first assessment information.

Further, the information acquisition unit 210 may acquire the information on the status of communication connections between the plurality of robots 300 which is specified with respect to a plurality of relay robots 300.

For example, the information acquisition unit 210 may specify a first relay target robot 300 and a second relay target robot 300 located within a predetermined distance (or a predetermined area) with respect to respective locations of a first relay robot 300 and a second relay robot 300, and may acquire information on status of a communication connection between the first relay robot 300 and the first relay target robot 300 and information on status of a communication connection between the second relay robot 300 and the second relay target robot 300 as the information on the status of communication connections between the plurality of robots 300.

Next, the communication scheme determination unit 220 according to one embodiment of the invention may function to determine a communication scheme to be used between the plurality of robots 300, with reference to the information on the status of communication connections between the plurality of robots 300 which is acquired by the information acquisition unit 210.

For example, when assessment information on status of communication connections between the plurality of robots 300 indicates that the status of communication connections is below a predetermined level (e.g., when a score calculated with reference to the status of communication connections between the plurality of robots 300 is below a predetermined level), the communication scheme determination unit 220 may determine a communication scheme that causes the assessment information on the status of communication connections between the plurality of robots 300 to indicate the highest level of status of communication connections, among communication schemes usable by the plurality of robots 300, as the communication scheme to be used between the plurality of robots 300. Meanwhile, the communication scheme determination unit 220 may specify communication schemes usable by the respective robots 300 with reference to specifications, performance, battery levels, assigned tasks, and the like of the respective robots 300, and may determine the communication scheme to be used between the plurality of robots 300 with reference to communication schemes usable by two or more robots 300 in common.

As another example, when a robot 300 for which status of a communication connection with the relay robot 300 is below a predetermined level, i.e., an abnormal robot 300 (e.g., a robot 300 whose communication connection with the relay robot 300 has been lost or is to be lost with a probability not less than a predetermined level) appears among the plurality of robots 300, the communication scheme determination unit 220 may determine a communication scheme that causes the status of the communication connection between the abnormal robot 300 and the relay robot 300 to be not below the predetermined level, among communication schemes usable by the plurality of robots 300, as the communication scheme to be used between the plurality of robots 300 (or between the abnormal robot 300 and the relay robot 300).

Further, the communication scheme determination unit 220 may divide the plurality of robots 300 in the serving place into a plurality of groups, and determine a communication scheme to be used by each of the plurality of divided groups.

For example, the communication scheme determination unit 220 may respectively (e.g., differently) determine a communication scheme used by a first robot group including a first robot 300 among the plurality of robots 300 (i.e., a group of robots that perform serving in a first area of the serving place) and a communication scheme used by a second robot group including a second robot 300 among the plurality of robots 300 (i.e., a group of robots performing serving in a second area of the serving place). Here, the plurality of groups may be determined on the basis of spatial information of the serving place, tasks assigned to the plurality of robots 300, and the like.

In addition, the communication scheme determination unit 220 may cause the at least one relay robot 300 to be moved to a predetermined location in the serving place, with reference to the information on the status of communication connections between the plurality of robots 300.

For example, when a robot 300 for which status of a communication connection with the relay robot 300 is below a predetermined level, i.e., an abnormal robot 300 appears among the plurality of robots 300 (or when such abnormal robots 300 appear at or above a predetermined level), the communication scheme determination unit 220 may cause the relay robot 300 to be moved to a location satisfying the condition that the sum of distances between the relay robot 300 and the plurality of other robots 300 is minimized, among locations in the serving place.

Next, according to one embodiment of the invention, the communication unit 230 may function to enable data transmission/reception from/to the information acquisition unit 210 and the communication scheme determination unit 220.

Lastly, according to one embodiment of the invention, the control unit 240 may function to control data flow among the information acquisition unit 210, the communication scheme determination unit 220, and the communication unit 230. That is, the control unit 240 according to one embodiment of the invention may control data flow into/out of the robot control system 200 or data flow among the respective components of the robot control system 200, such that the information acquisition unit 210, the communication scheme determination unit 220, and the communication unit 230 may carry out their particular functions, respectively.

Figure 3:
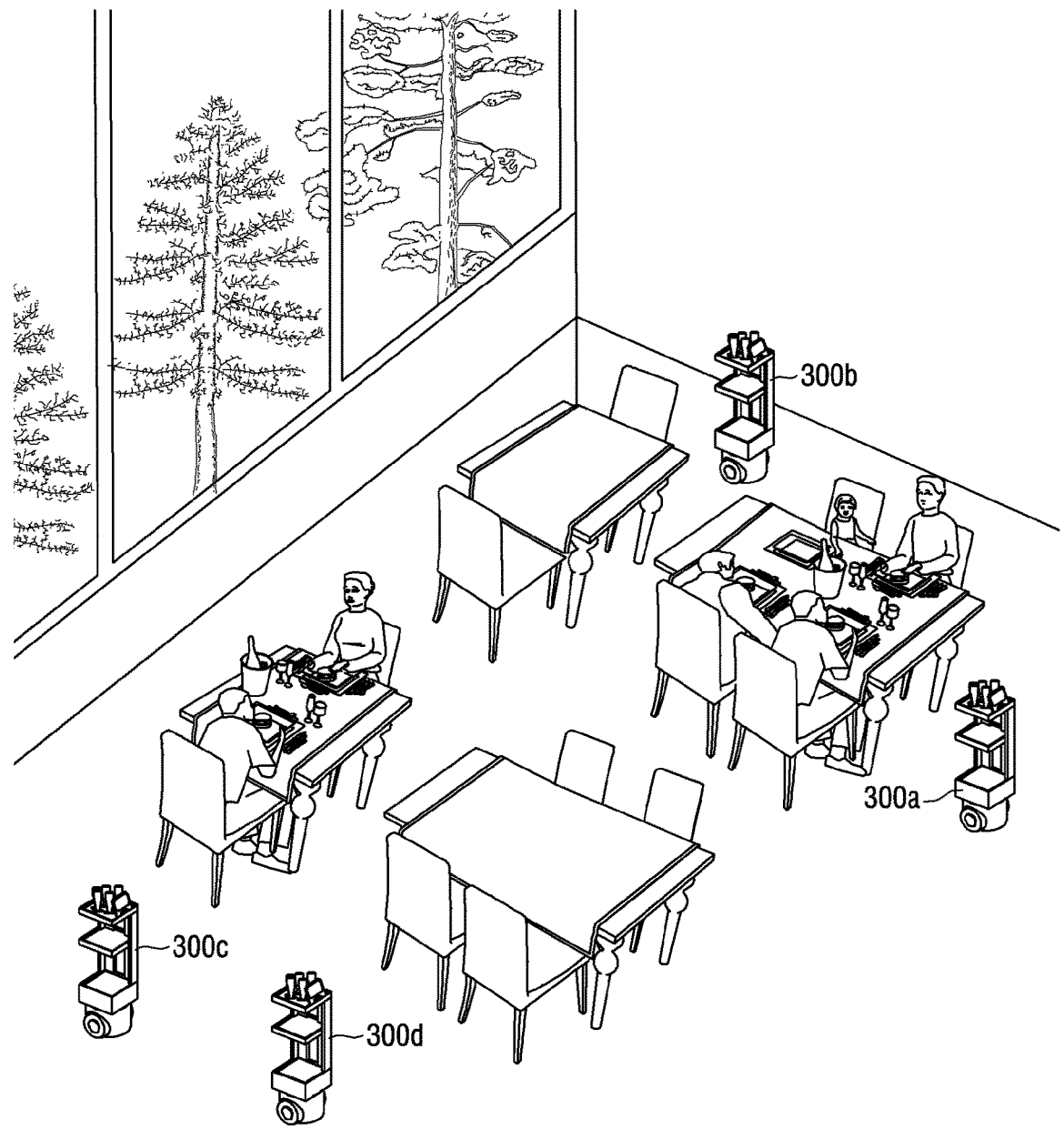
FIG. 3 illustratively shows a situation in which a plurality of robots located in a serving place are controlled according to one embodiment of the invention.
Figure 4:
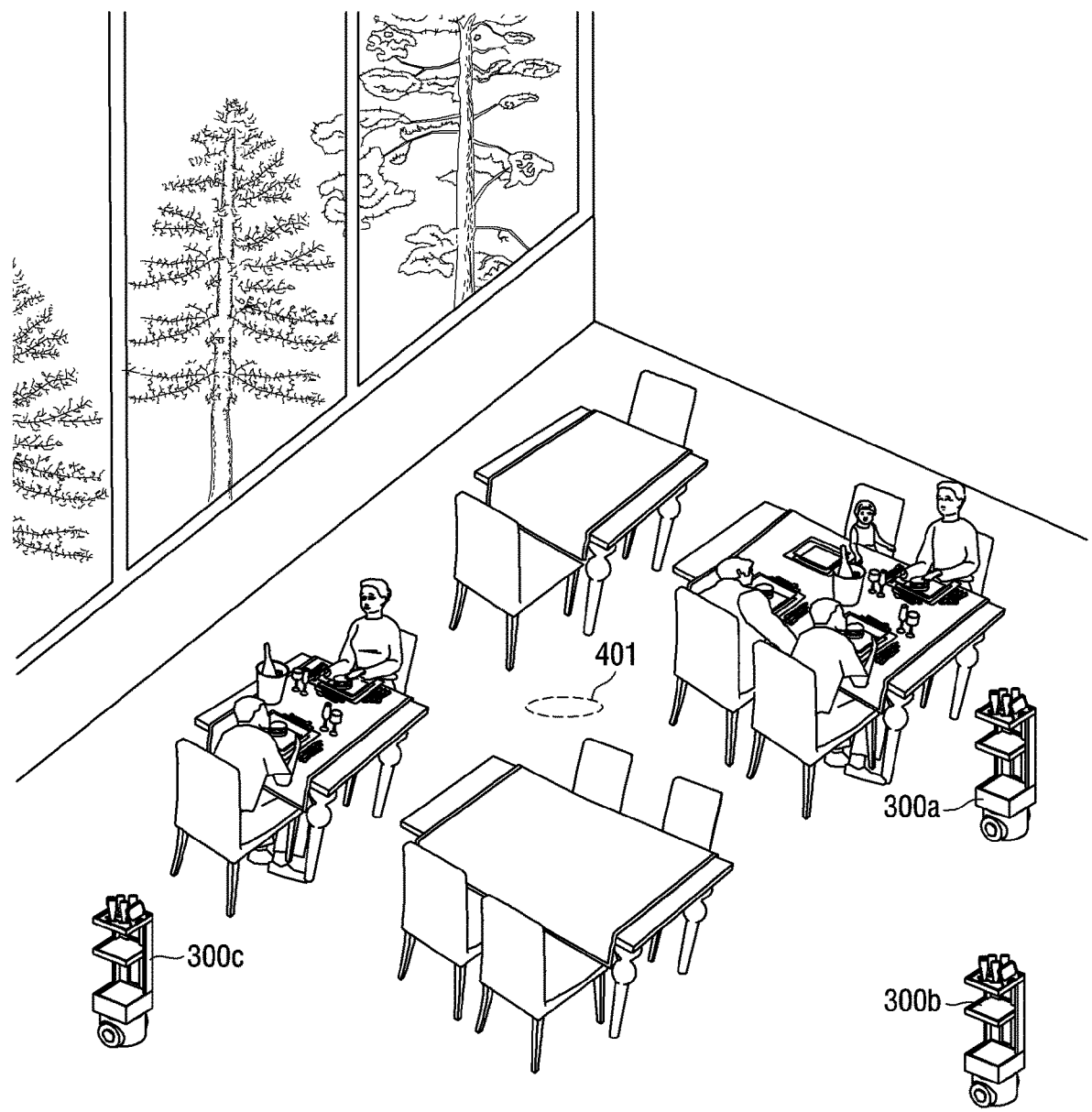
FIG. 4 illustratively shows a situation in which a plurality of robots located in a serving place are controlled according to one embodiment of the invention.

FIGS. 3 and 4 illustratively show situations in which a plurality of robots 300 located in a serving place are controlled according to one embodiment of the invention.

Referring to FIG. 3, it may be assumed that the serving place according to the invention is a restaurant, and services associated with the serving place are provided by a plurality of robots 300a, 300b, 300c, and 300d located in the serving place. For example, when the serving place according to one embodiment of the invention is a restaurant, the services associated with the serving place may include services such as reception, order taking, serving, and payment taking.

First, according to one embodiment of the invention, information on status of communication connections between the plurality of robots 300a, 300b, 300c, and 300d located in the serving place may be acquired, wherein the status of communication connections between the plurality of robots 300a, 300b, 300c, and 300d is specified with respect to a relay robot 300a, 300b, 300c, or 300d among the plurality of robots 300a, 300b, 300c, and 300d.

For example, a robot closest to a center position of the serving place among the plurality of robots 300a, 300b, 300c, and 300d may be determined as the relay robot 300a, and information on status of a communication connection between the relay robot 300a and the second robot 300b, information on status of a communication connection between the relay robot 300a and the third robot 300c, and information on status of a communication connection between the relay robot 300a and the fourth robot 300d may be acquired as the information on the status of communication connections between the plurality of robots 300a, 300b, 300c, and 300d. Meanwhile, the relay robot 300a may be designated by a manager of the restaurant.

Next, a communication scheme to be used between the plurality of robots 300a, 300b, 300c, and 300d may be determined from among communication schemes usable by the plurality of robots 300a, 300b, 300c, and 300d, with reference to the information on the status of communication connections between the plurality of robots 300a, 300b, 300c, and 300d. For example, the communication schemes usable by the respective robots 300a, 300b, 300c, and 300d may be specified with reference to specifications, performance, battery levels, assigned tasks, and the like of the plurality of robots 300a, 300b, 300c, and 300d, and a communication scheme usable by two or more robots 300 in common may be determined as the communication scheme to be used between the plurality of robots 300a, 300b, 300c, and 300d. Here, the communication schemes usable by the plurality of robots 300a, 300b, 300c, and 300d may include communication schemes based on Bluetooth communication, Wi-Fi communication, LTE communication, infrared communication, and the like.

For example, when the communication scheme used between the plurality of robots 300a, 300b, 300c, and 300d is a first communication scheme (e.g., Bluetooth communication) and status of a communication connection between the relay robot 300a and at least one robot 300b, 300c, or 300d among the plurality of robots 300a, 300b, 300c, and 300d is below a predetermined level, assessment information (or an assessment score) on status of communication connections between the plurality of robots 300a, 300b, 300c, and 300d which is specified with respect to the first communication scheme among the communication schemes usable by the plurality of robots 300a, 300b, 300c, and 300d may be compared with assessment information (or an assessment score) on status of communication connections between the plurality of robots 300a, 300b, 300c, and 300d which is specified with respect to a second communication scheme (e.g., Wi-Fi communication) among the communication schemes usable by the plurality of robots 300a, 300b, 300c, and 300d, and a communication scheme corresponding to the assessment information indicating a higher level of status of communication connections may be determined as the communication scheme to be used between the plurality of robots 300a, 300b, 300c, and 300d.

Meanwhile, in the above case, although the communication schemes used between all the robots 300a, 300b, 300c, and 300d may be collectively changed to a different communication scheme (i.e., a communication scheme corresponding to assessment information indicating a higher level of status of communication connections), only the communication scheme between the relay robot 300a and the robot 300b for which status of a communication connection with the relay robot 300a is below a predetermined level may be changed to a different communication scheme.

For example, when the relay robot 300a is connected to each of the second robot 300b, the third robot 300c, and the fourth robot 300d using a first communication scheme (e.g., Bluetooth communication), a situation may occur in which status of communication connections between the relay robot 300a and the third robot 300c and the fourth robot 300d is not below a predetermined level, whereas status of a communication connection between the relay robot 300a and the second robot 300b is below the predetermined level. In this case, the communication scheme between the relay robot 300a and the second robot 300b may be changed to a second communication scheme (e.g., Wi-Fi communication) that causes the status of the communication connection between the relay robot 300a and the second robot 300b to be not below the predetermined level. Meanwhile, in this case, it may be further considered whether the status of the communication connections is not below the predetermined level when the relay robot 300a is connected to each of the third robot 300c and the fourth robot 300d using the second communication scheme.

Meanwhile, referring to FIG. 4, according to one embodiment of the invention, a situation may occur in which status of communication connections between a plurality of robots 300a, 300b, and 300c is below a predetermined level, depending on placement of the plurality of robots 300a, 300b, and 300c in the serving place.

Referring to FIG. 4, when the relay robot 300b (i.e., the second robot 300b) and the first robot 300a are located on the right side in the serving place, and the third robot 300c is located on the left side in the serving place, status of a communication connection between the relay robot 300b and the third robot 300c may be below a predetermined level. In this case, the relay robot 300b may be moved to a predetermined location in the serving place, i.e., a location 401 corresponding to a center point between the first robot 300a and the third robot 300c, so that the status of communication connections between the plurality of robots 300a, 300b, and 300c may be improved.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 5:
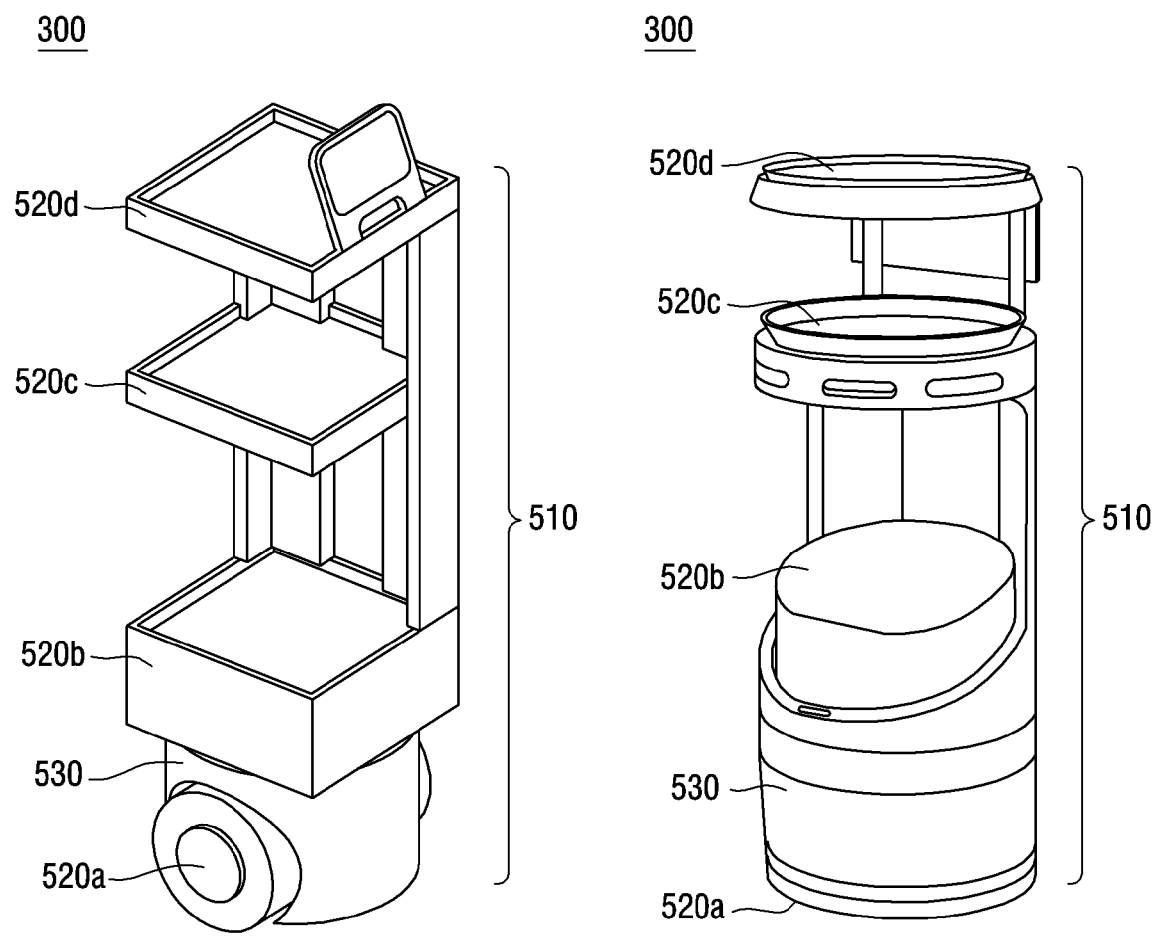
FIG. 5 illustratively shows the structure of a robot according to one embodiment of the invention.
Figure 6:
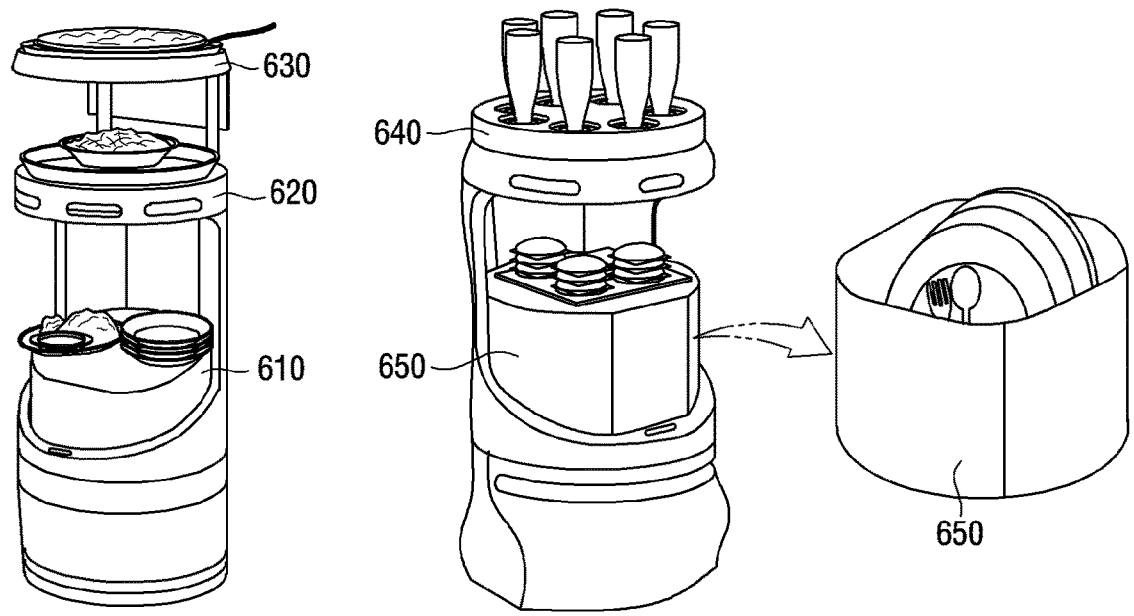
FIG. 6 illustratively shows the structure of a robot according to one embodiment of the invention.

FIGS. 5 and 6 illustratively show the structure of a robot according to one embodiment of the invention.

Referring to FIG. 5, the robot 300 may comprise a main body 510, a drive unit 520a, 520b, 520c, 520d, and a processor 530.

For example, the main body 510 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Referring to FIG. 6, when the robot 300 is a serving robot, it may include a first space 610 and a second space 620 for providing the transported object and collecting the retrieved object. Further, the robot 300 may further include a third space 630 that is an expansion space provided via a removable pillar, and more loading spaces may be provided by adding more expansion spaces as needed. Further, the robot 300 may further include a tray 640 dedicated for the transported or retrieved object. For example, the tray 640 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 610 of the robot 300 may include a fourth space 650 that may be taken out through a lateral side of the robot 300. The fourth space 650 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 5, the main body 510 may further include an imaging module (e.g., a visible light camera or an infrared camera) (not shown) and a scanner module (e.g., a LIDAR sensor) for acquiring images of surroundings (e.g., customers, tables, employees, other robots 300, etc.) and information on obstacles.

Further, a display (e.g., a tablet) provided with a user interface through which a customer or a user of the robot 300 may input various commands and capable of visually providing an image content according to the invention may be attached to (or placed at) the removable pillar of the main body 510 (or one end of the pillar). The display according to one embodiment of the invention may communicate with the drive unit 520*a*, 520*b*, 520*c*, 520*d* or the processor 530 by wire or wirelessly. Here, the position to which the display according to the invention is attached is only an example, and may be diversely changed as long as the objects of the invention may be achieved.

In addition, the upper part or lower part of the main body 510 may further include a speaker capable of providing a sound content associated with a service provided by the robot 300.

Next, the drive unit 520*a*, 520*b*, 520*c*, 520*d* according to one embodiment of the invention may comprise a module for moving the main body 510 to other locations or a module for loading and unloading the transported and retrieved objects.

For example, the drive unit 520*a*, 520*b*, 520*c*, 520*d* may include a module related to electrically, mechanically, or hydraulically driven wheels, propellers, or the like as the module for moving the main body 510 to other locations, and may include a robotic arm module for mounting and conveying the transported and retrieved objects as the module for loading and unloading the transported and retrieved objects.

Next, the processor 530 according to one embodiment of the invention may be electrically connected to the drive unit 520*a*, 520*b*, 520*c*, 520*d* to perform a function of controlling the drive unit 520*a*, 520*b*, 520*c*, 520*d* (and may include a communication module for communicating with an external system). For example, the processor 530 may refer to a data processing device that are embedded in hardware and have circuits physically structured to perform codes included in a program or functions represented by instructions. For example, such a data processing device embedded in hardware may include a processing device such as a microprocessor, a central processing unit, a processor core, a multi-processor, an application-specific integrated circuit (ASIC), and a field programmable gate array (FPGA).

Further, the processor 530 may perform the functions of at least one of the information acquisition unit 210 and the communication scheme determination unit 220 of the robot control system 200 according to the invention (e.g., the corresponding functions may be modularized and included in the processor 530), and may function to control the drive unit 520*a*, 520*b*, 520*c*, 520*d* through communication with an external system (not shown) that performs the functions of at least one of the information acquisition unit 210 and the communication scheme determination unit 220.

Specifically, the processor 530 may function to acquire information on status of communication connections between a plurality of robots 300 located in a serving place, wherein the status of communication connections between the plurality of robots 300 is specified with respect to at least one relay robot 300 among the plurality of robots 300, and to determine a communication scheme to be used between the plurality of robots 300, with reference to the information on the status of communication connections between the plurality of robots 300.

Although the embodiments in which the serving place according to the invention is a restaurant have been mainly described above, it is noted that the serving place is not necessarily limited to a restaurant, and may be changed to a cafe, pub, bar, or the like without limitation as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a robot, the method comprising the steps of:
acquiring information on status of communication connections between a plurality of robots located in a serving place, wherein the status of communication connections between the plurality of robots is specified with respect to at least one relay robot among the plurality of robots; and
determining a communication scheme to be used between the plurality of robots, with reference to the information on the status of communication connections between the plurality of robots,
wherein the at least one relay robot is dynamically determined according to at least one of a predetermined cycle and a predetermined trigger condition.

2. The method of claim 1, wherein in the acquiring step, the at least one relay robot is determined with reference to at least one of placement information of the plurality of robots and spatial information of the serving place.

3. The method of claim 1, wherein in the acquiring step, the at least one relay robot is determined with reference to first assessment information on status of communication connections specified with respect to a first robot among the plurality of robots, and second assessment information on status of communication connections specified with respect to a second robot among the plurality of robots.

4. The method of claim 1, wherein the at least one relay robot is a plurality of relay robots.

5. The method of claim 1, wherein in the determining step, the communication scheme to be used between the plurality of robots is changed when status of a communication connection between the at least one relay robot and at least one robot among the plurality of robots is below a predetermined level.

6. The method of claim 1, wherein in the determining step, at least one robot among the plurality of robots is moved to a predetermined location in the serving place when the status of communication connections between the plurality of robots is below a predetermined level, and
wherein the predetermined location includes a location that causes the status of communication connections between the plurality of robots to be not below the predetermined level.

7. The method of claim 1, wherein a communication scheme used by a first robot group including a first robot among the plurality of robots is different from a communication scheme used by a second robot group including a second robot among the plurality of robots.

8. A non-transitory computer-readable recording medium having stored thereon a computer program for executing a method for controlling a robot, the method comprising the steps of:
acquiring information on status of communication connections between a plurality of robots located in a serving place, wherein the status of communication connections between the plurality of robots is specified with respect to at least one relay robot among the plurality of robots, and
determining a communication scheme to be used between the plurality of robots, with reference to the information on the status of communication connections between the plurality of robots
wherein the at least one relay robot is dynamically determined according to at least one of a predetermined cycle and a predetermined trigger condition.

9. A system for controlling a robot, the system comprising:
an information acquisition unit configured to acquire information on status of communication connections between a plurality of robots located in a serving place, wherein the status of communication connections between the plurality of robots is specified with respect to at least one relay robot among the plurality of robots; and
a communication scheme determination unit configured to determine a communication scheme to be used between the plurality of robots, with reference to the information on the status of communication connections between the plurality of robots,
wherein the at least one relay robot is dynamically determined according to at least one of a predetermined cycle and a predetermined trigger condition.

10. The system of claim 9, wherein the information acquisition unit is configured to determine the at least one relay robot with reference to at least one of placement information of the plurality of robots and spatial information of the serving place.

11. The system of claim 9, wherein the information acquisition unit is configured to determine the at least one relay robot with reference to first assessment information on status of communication connections specified with respect to a first robot among the plurality of robots, and second assessment information on status of communication connections specified with respect to a second robot among the plurality of robots.

12. The system of claim 9, wherein the at least one relay robot is a plurality of relay robots.

13. The system of claim 9, wherein the communication scheme determination unit is configured to change the communication scheme to be used between the plurality of robots when status of a communication connection between the at least one relay robot and at least one robot among the plurality of robots is below a predetermined level.

14. The system of claim 9, wherein the communication scheme determination unit is configured to cause at least one robot among the plurality of robots to be moved to a predetermined location in the serving place when the status of communication connections between the plurality of robots is below a predetermined level, and
wherein the predetermined location includes a location that causes the status of communication connections between the plurality of robots to be not below the predetermined level.

15. The system of claim 9, wherein a communication scheme used by a first robot group including a first robot among the plurality of robots is different from a communication scheme used by a second robot group including a second robot among the plurality of robots.

* * * * *